Patented July 16, 1940

2,208,185

UNITED STATES PATENT OFFICE 2,208,185

GRANULAR MAGNESIA PRODUCT

Monson Fraser Goudge, Ottawa, Ontario, Canada, assignor to Canadian Refractories Limited, Montreal, Quebec, Canada, a corporation of Canada No Drawing. Application May 27, 1939, Serial No. 276,124. In Canada March 28, 1939

6 Claims. (Cl. 23—201)

This invention relates to the production of a magnesium product in a structural and chemical form which renders it more suitable, for a number of important uses, than other magnesium products now available for such purposes. The invention contemplates the recovery of the product, in the desired form, from naturally occurring rocks containing the mineral brucite by an economical and readily controlled method.

It has been observed that in certain natural rocks the mineral brucite occurs in a well defined structural particle form, as distinct from the massive form in which, for example, magnesite is found in natural deposits. The brucite particles are in the form of roughly spherical masses or granules, having a somewhat complex scaly-concentric structure and ranging in size from about 1 to 13 mm. in diameter, the more common range being from 1 to 6 mm. The average diameter of the granules is in the neighborhood of 2 mm. The granules are firmly set in a matrix usually consisting essentially of calcite or calcite and dolomite. They have a somewhat waxy lustre and are not as brittle as the surrounding matrix. They are translucent and usually substantially white. The predazzites and pencatites are illustrative of the type of rock in which brucite is found in this form.

The object of the present invention is to extract from such rock a substantially pure magnesian product in substantially the structural form of these naturally occuring brucite granules and to thus provide a new and useful commercial product.

In accordance with the invention rock of the character described is calcined, then hydrated with water to convert the lime (the calcined calcite and dolomite) to a powder but leave the calcined brucite in the natural granular form described, and the granules are freed from the hydrated lime or other impurities.

The calcination may be effected in ordinary lime kilns of either the vertical or rotary type. The rock to be calcined is broken to proper size, as in usual lime burning practice. When the matrix of the rock surrounding the brucite granules contains a substantial portion of dolomite, the calcining temperature should preferably be less than 1000° C. Otherwise part or all of the dolomite may become nearly inert or dead-burned in which form it will not readily slake to a powder. With a matrix of calcite, a calcining temperature in the neighborhood of 1200 or 1300° C. may be employed without ill effects. Naturally the higher temperature requires a shorter calcination period. The calcined product comprises essentially the dehydrated brucite granules in their original structural form and lime. The granules have become opaque and somewhat darker in colour, the extent of colour change depending largely upon the amount of iron present. There is a slight shrinkage in volume and in some of the granules incipient cracks appear, arranged substantially radially.

The calcined product is then hydrated in any desired type of apparatus, such as is used in the lime industry, and sufficient cold water is added to convert the lime into a dry powder, while leaving the calcined brucite substantially unaffected. If the recovery of the lime is not an objective, excess water may be used to remove the lime. There is some surface hydration of the calcined brucite granules, particularly if the hydrating temperature is allowed to rise unduly. Thus, where it is desired to hydrate the calcined brucite as little as possible, the temperature should be kept down, as for example, by charging relatively small amounts to the hydrator. A suitable temperature for dry hydration of lime is about 120° C. where the minimum amount of hydration of the calcined brucite is desired. If the rock were calcined in large lumps, it is desirable to crush the calcined material before hydrating.

The granules are separated from the finely divided hydrated material preferably by an air separator, in which the hydrated lime powder is removed by controlled currents of air, and the granules are discharged to a washing machine, or the like, for the removal of adhering lime dust. The washing is preferably done quickly and with cold water so as to cause a minimum further hydration of the calcined brucite granules. On the other hand, if it is desired to substantially hydrate the calcined brucite, the final washing should be with hot water and sufficient time, say two hours, allowed for the hydration to take place. To overcome undesired hydration, the granules may be heated in a rotary drier at a temperature of say 400 to 500° C.

Impurities, coarser than the powdered lime, which are not removed by air and washing, may be separated by screening, tabling, jigging or other convenient method. However, with the better grade deposits of rock of the character in question, this additional purification step is not required.

The granules constitute the major commercial product of the method described, although the hydrated lime is in a form for commercial use.

These granules consist of calcined brucite which normally and preferably is but slightly hydrated although if desired it may be completely hydrated. The natural mineral brucite contains 31% of water of crystallization. These granules, prepared as described, may contain say 5% of such water unless reheated as indicated. Apart from their small water content the granules may be substantially pure MgO. That is the MgO content may be 98% with a trace of impurities such as lime, silica iron or the like. They have the structural form and substantially the size of the original brucite particles, which better adapt the granules for various uses to which such magnesian products are put than products of substantially similar magnesium content now available. Owing to this structural form a mass of the granules is relatively porous and may be treated with a gas or the like more readily than a mass of powdered material. The scaly-concentric structure facilitates reaction or bonding with other materials. They do not have the vitreous-like surface or compact dense structure of particles of periclase, for example. They are thus well adapted for use in refractory products, the production of metallic magnesium as well as for other purposes which will be apparent to those skilled in the art.

Should dead-burned dolomite be formed in the calcining step of the method, thus causing incomplete hydration and incomplete breaking down to a powder of the calcined dolomite during the hydrating step, an additional step is employed to insure substantially complete removal of the lime from the final mass of granules. After drying, the granular product carrying the incompletely hydrated lumpy dolomite is heated in a rotary kiln to a temperature of say 500° C. to drive off the water of hydration. The lumps of dolomite are then readily disintegrated upon the addition of cold water to the cooled product, the brucite granules remaining unaffected.

I claim:

1. A method of producing substantially pure unburned magnesian granules which comprises calcining rock containing natural brucite granules, hydrating the calcined mass to break down to a powder the calcined rock associated with the granules and separating the discrete granules from the powdered material.

2. A method of producing a substantially pure magnesian product in the form of discrete granules, comprising calcining a rock, such as predazzite and pencatite, containing brucite in the form of substantially spherical granules of scaly-concentric structure hydrating the calcined product at a temperature of about 120° C. and removing the pulverulent material from the discrete magnesian granules.

3. A method of producing a substantially pure unburned magnesian product in the form of discrete granules which comprises calcining rock containing natural brucite granules without deadburning the rock, hydrating the calcined rock at a low temperature to reduce to powder form all but the granules and separating the granules from the powder.

4. Discrete granules of calcined brucite substantially free from lime and other impurities, and having a substantially uniform structure of roughly spherical form, said granules being produced by calcination of rock which contains brucite in the form of granules surrounded by a matrix, hydrating said calcined rock, and separating the discrete magnesian granules from pulverulent material.

5. A new product comprising a mass of discrete granules of calcined brucite, the mass and said granules being substantially free from lime and other impurities, said granules having a substantially scaly structure and being produced by calcination of rock which contains brucite in the form of granules surrounded by a matrix, hydrating the calcined rock, and separating the discrete magnesian granules from pulverulent material.

6. A mass of discrete granules of calcined brucite substantially free from lime and other impurities, said granules having a substantially uniform structure of roughly spherical form and varying in size from one to thirteen millimeters and being produced by calcination of rock which contains brucite in the form of granules surrounded by a matrix, hydrating the calcined rock, and separating the discrete magnesian granules from pulverulent material.

MONSON FRASER GOUDGE.